United States Patent [19]

Burch et al.

[11] Patent Number: 5,023,651
[45] Date of Patent: Jun. 11, 1991

[54] METHOD OF AND APPARATUS FOR RE-CREATING IMAGES

[75] Inventors: Richard J. Burch, Billericay; Brian W. Oxley, Beckenham, both of Great Britain

[73] Assignee: Gilchrist Studios Group Limited, London, England

[21] Appl. No.: 463,862
[22] PCT Filed: Feb. 18, 1987
[86] PCT No.: PCT/GB87/00121
  § 371 Date: Oct. 13, 1987
  § 102(e) Date: Oct. 13, 1987
[87] PCT Pub. No.: WO87/05126
  PCT Pub. Date: Aug. 27, 1987

[30] Foreign Application Priority Data

Feb. 19, 1986 [GB] United Kingdom ............ 8700121

[51] Int. Cl.⁵ ............................................. G03B 27/00
[52] U.S. Cl. ................................. 355/1; 358/200; 355/20; 355/52; 355/81
[58] Field of Search ............... 355/1, 20, 52, 81; 358/200

[56] References Cited

U.S. PATENT DOCUMENTS

| 3,125,812 | 3/1964 | Simpson . | |
| 3,163,080 | 12/1964 | Miller | 355/1 |
| 3,192,391 | 6/1965 | Ressler | 358/200 |
| 3,448,207 | 6/1969 | Green et al. | 358/200 |
| 3,459,888 | 8/1969 | Sokolov | 355/20 |
| 3,512,861 | 5/1970 | Shackert | 355/1 |
| 3,537,788 | 11/1970 | Young | 355/20 |
| 3,861,797 | 1/1975 | Nishida et al. | |
| 4,674,834 | 6/1987 | Margolin | 355/1 |
| 4,702,552 | 10/1987 | Margolin | 355/1 |

FOREIGN PATENT DOCUMENTS

| 3220016 | 12/1983 | Fed. Rep. of Germany . |
| 1165749 | 10/1969 | United Kingdom . |
| 1171552 | 11/1969 | United Kingdom . |
| 2040057A | 8/1980 | United Kingdom . |
| 2088585A | 6/1982 | United Kingdom . |
| 2115566A | 9/1983 | United Kingdom . |
| 2151558A | 7/1985 | United Kingdom . |

Primary Examiner—Monroe H. Hayes
Attorney, Agent, or Firm—Fitch, Even, Tabin & Flannery

[57] ABSTRACT

An original photographic image (5) is interrupted by a controlled shutter (10) and simultaneously scanned by a light collector (21) over a planar reference frame by relative movement between the image and the collector (21) along a series of linear side-by-side scanning paths. A light emitter (22) which emits light corresponding to that collected scans a similar planar frame of unexposed film (6) by relative movement between the film and the emitter along a series of linear side-by-side scanning paths. A computer (8) controls the scanning operations and the shutter (10) to cause the image reproduced on the film by exposure to the light emitter to differ to that of the original image.

18 Claims, 4 Drawing Sheets

METHOD OF AND APPARATUS FOR RE-CREATING IMAGES

This application is a continuation of application Ser. No. 116,722 filed as PCT GB87/00121 on Feb. 18, 1987, published as WO87/05126 on Aug. 27, 1987, now abandoned.

The present invention relates to a method of and apparatus for re-creating photographic images.

When it is desired to alter a photographic image to create a desired effect it has hitherto been conventional practice to treat the basic artwork (negative or positive) with bleaches and dyes in a process known as re-touching or to use masks during printing in a process known as photo-composition or to use a combination of both these techniques. These are skilled time consuming operations. There are other related fields such a photolithography where it is sometimes desired to alter a photographic image as artwork prior to subsequent processing.

In the graphic arts field it is known to convert original artwork into digital signals representing colour and intensity, to modify these signals and then to recreate an image carried on the artwork with some alteration. Such equipment is relatively costly however and there is a need for a simpler method and apparatus for re-creating images. Accordingly, a general object of the present invention is to provide an improved method of and apparatus for re-creating a photographic image with selective alterations.

In one aspect the invention provides a method of re-creating a photographic image with selective alterations; said method comprising relatively scanning a first photographic image with light collecting means, transmitting light derived from the collecting means to light emitting means, relatively scanning the light emitting means over a photograhic film to expose the film and create a second photographic image thereon and independently controlling the respective scanning operations to alter the second image in some respect from the first.

The invention also provides apparatus for use in re-creating a photographic image with selective alterations; said apparatus comprising first means for relatively scanning a first photographic image with light collecting means, means for causing light emitting means to emit light derived from the light collecting means, second means for relatively scanning the light emitting means over photographic film to expose the film and create a second photographic image and control means for controlling the scanning operations independently to alter the second image in some respect from the first image.

Usually, the scanning operations would involve moving the collecting and emitting means along a series of linear paths which are side-by-side.

The transmitting means may be a bundle of optical fibres forming a direct optical link between the respective scanning means or heads. The control means would normally permit the scanning operations to run in synchronism over portions of the image which are not to be altered and then interrupt this synchronism when the second image is to be varied. For example, by halting the first scanning means so that the light collecting means remains in one location the second scanning means can be made to scan over regions of the photographic film to impose the same areal image portion on the second image as the small almost punctiform image portion of the first image corresponding to that one location. This is especially useful for backgrounds where additional areas of sky or the like can be imposed on the second image. Alternatively another image can be scanned by the light collecting means to produce in the second image a region or regions corresponding to this other image rather than to the first image.

A convenient way of producing the first image is by back illumination of a photographic transparency. It is also desirable to use occluder means such as a shutter, to control the light used to form the original image. The shutter can then be controlled in association with the scanning operations so as to block light reaching the collecting means at the end limits of the scanning lines.

The control means is best a computer capable of storing information pertaining to the control of the scanning operations. For example, a user may superimpose the artwork carrying the first image or the other image on a digitizer grid and use an interactive probe linked to a computer forming the control means to identify the areas of the first image to be altered.

Exposure modifiers such as masks or other transparancies can be positioned between the light emitter and the unexposed film to impose some other effect on the final image.

In another aspect the invention provides a method of re-creating a photographic image with selective alterations; said method comprising creating a first photographic image by controlled illumination of a photographic transparency, scanning said image with discrete light collecting means smaller than the image by performing relative progressive linear movements between the image and the collecting means in the manner of a t.v. raster, independently scanning a frame of unexposed photographic film with discrete light emitting means smaller than the image by performing relative progressive linear movements between the frame and the emitting means in the manner of a t.v. raster, causing the emitting means to emit light in accordance with the light collected by the collecting means and controlling both the scanning operations in a manner to cause the emitting means to produce a second image on the film frame which reproduces at least some part of the first image while differing in some other respect from the first image.

In a further aspect the invention provides a method of re-creating an image carried on original photographic film but with selective controlled alterations; said method comprising forming an image by projecting light modified by original photographic film; subjecting the image to a scanning process with a punctiform light collector, the scanning process involving relative movement between the image and the collector to define a reference frame formed by a series of indexed lines of movement and subjecting the image to the action of occluder means to inhibit the collection of light at certain times during the scanning process, transferring light collected by the collector or information representing such light to a punctiform light emitter, subjecting unexposed photographic film to another scanning process to create another image, the other scanning process involving relative movement between the film and the light emitter to expose the film over a frame formed by a series of indexed lines of movement and generally corresponding to the reference frame and controlling the scanning processes and the action of the occluder means with the aid of a computer to cause correlation of the processes over at least one region of the respective frames where the corresponding part of the other image is to be the same as the corresponding part of the original image and to cause non-correlation of the processes over at least one further region of the respective frame where a corresponding part of the other image is to be different to the corresponding other part of the original image.

Apparatus constructed in accordance with the invention may comprise means for forming a first photographic image by controlled illumination of a photographic transparency, means for scanning the image with discrete light collecting means smaller than the image by performing progressive linear movements between the image and the collecting means in the manner of a t.v. raster, means for independently scanning a frame of unexposed photographic film with discrete light emitting means smaller than the frame by performing progressive linear movements between the frame and the emitting means in the manner of a t.v. raster, means for causing the emitting means to emit light in accordance with the light collected by the collecting means and control means for controlling both the scanning means to cause the emitting means to produce a second image on the film frame which reproduces at least some part of the first image while differing in some other respect from the first image.

Apparatus constructed in accordance with the invention may also comprise means for forming an image from projected light modified by original photographic film, punctiform light collecting means for scanning the image over a reference frame by relative movement between the collecting means and the image to define a series of indexed scanning lines of relative movement, means for subjecting the image to periodic interruptions to inhibit the collection of light at certain times during the scanning process, a punctiform light emitter, means for scanning unexposed photographic film with the light emitter to create another image by relative movement between the film and the light emitter over a frame formed by a series of indexed scanning lines of relative movement generally corresponding to the reference frame, and a computer programmed to control the operation of the respective scanning means and the interruption means to cause correlation of the scanning over at least one region of the respective frames where the corresponding part of the other image is to be the same as the corresponding part of the original image and to cause non-correlation of the processes over at least one further region of the respective frame where a corresponding part of the other image is to be different to the corresponding other part of the original image.

The invention may be understood more readily and various other features of the invention may become apparent from consideration of the following description.

Embodiments of the invention will now be described by way of examples only with reference to the accompanying drawings wherein.

Figure 1:
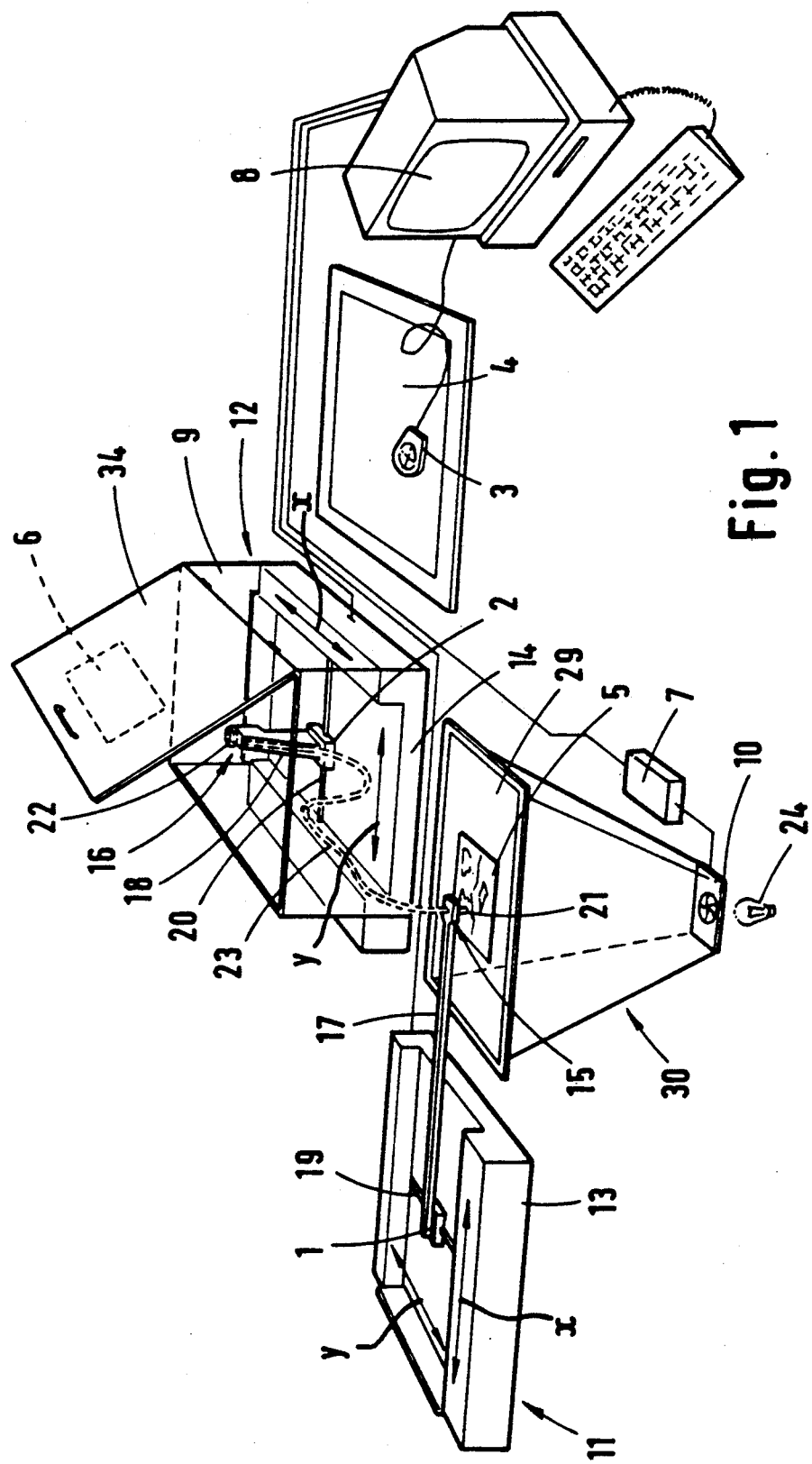
FIG. 1 is a schematic representation of apparatus constructed in accordance with the invention.
Figure 2:
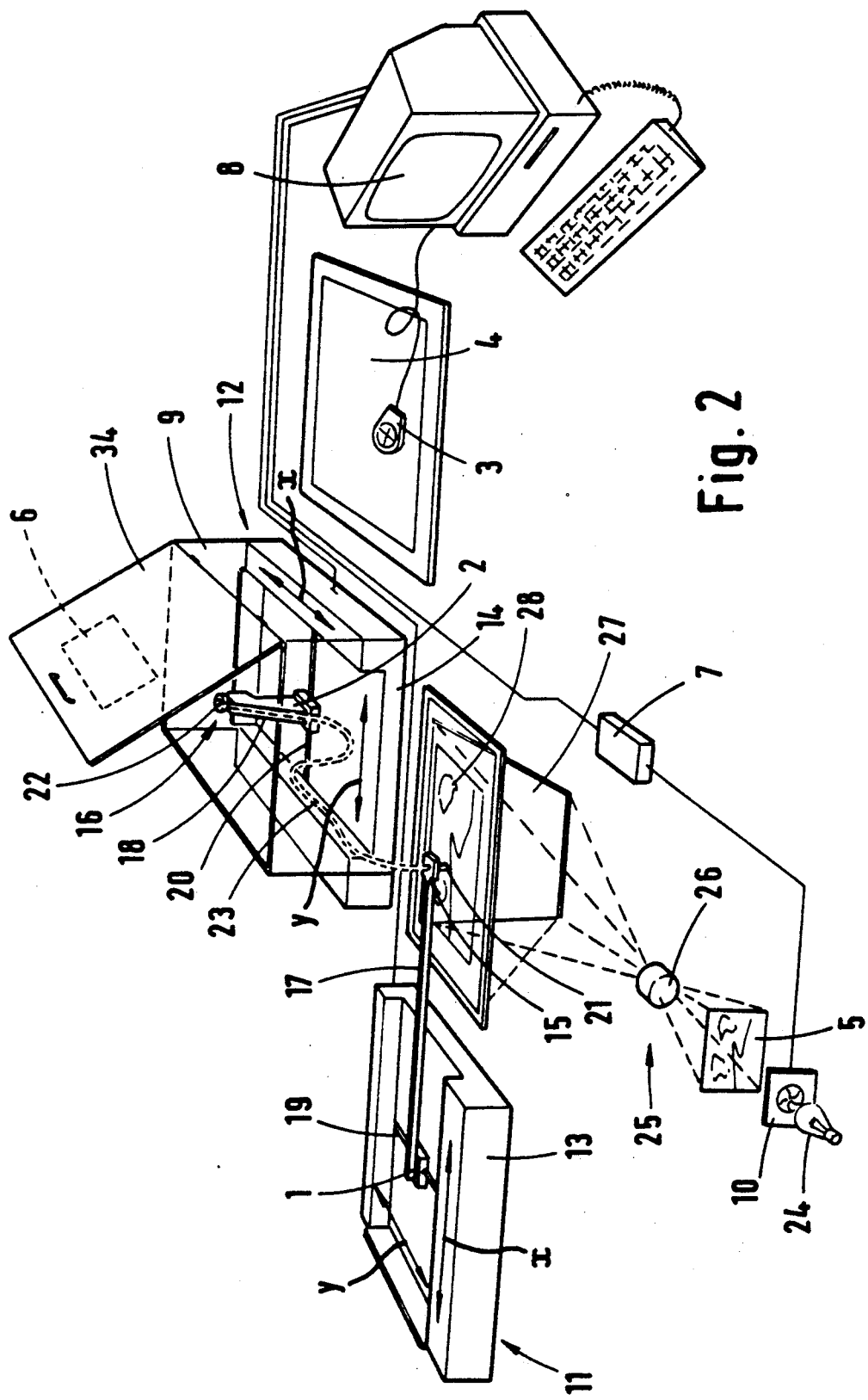
FIG. 2 is a schematic representation of a further form of apparatus constructed in accordance with the invention.

FIG. 1 depicts a basic form of apparatus constructed in accordance with the invention. As shown the apparatus is composed of first and second scanner units 11, 12 each in the form of an x y plotter 13, 14. The plotter 14 has a displaceable block or carriage 2 with a superimposed structure 18 forming a scanning means or head 16. The plotter 13 has a similar displaceable block or carriage 1 linked with an arm 17 to a scanning means or head 15. The carriages 1, 2 are mounted for displacement along rails 19, 20 which are in turn mounted for displacement at their ends on linear bearings or supports. Thus, as is known, the scanning heads 15, 16 can be moved in a single plane in orthogonal x and y directions as indicated by arrows x, y to define respective frames, conveniently rectangular, with scanning lines (arrow y) indexed in steps (arrow x). The heads 15, 16 are displaced by drive means of the units 11, 12 in a controlled manner defined with the aid of a control unit 8 which is conveniently in the form of a small personal computer. The scanning head 15 supports a light collector 21 and the head 16 supports a light emitter 22. The light collector and emitter or input and output 21, 22 are small in relation to the scanning frames and can be considered as of punctiform configuration in relation to the frames. The collector 21 and the emitter 22 are here interconnected directly by a fibre optic link 23. In a practical construction based on the foregoing, the fibre optic link 23 is composed of a bundle of 160,000 fibres. The light collector 21 and emitter 22 can be the ends of the optical fibres making up the link 23 but it is also possible to incorporate a lens at one or both ends so the lens and fibre ends then collectively form the collector and/or emitter 21, 22. During use, artwork 5 in the form of a film positive or negative is mounted beneath the head 15 and back-illuminated by a suitable light source 24. Conveniently, and as shown, the artwork 5 is superimposed on a transparent or translucent bed 29 of a light box 30. Occluder means in the form of an electro-magnetic shutter 10 is interposed between the source 24 and the artwork 5 to obstruct the light selectively. The shutter 10 can be of known type. The shutter 10 is controlled by the control unit 8 via a driver 7 and generally blocks the light where the scanning head 15 locates the collector 21 at the ends of the scanning lines. Other effects are possible however. Although the light collector 21 is operated to scan the artwork 5 directly, it is feasible to use an optical system to project an image of the artwork 5 onto a plane and to scan this original image with the collector 21. It is then possible to incorporate an enlarger to modify the size of the image of the artwork 5. FIG. 2 illustrates this modified arrangement where the optical system designated 25 incorporates a lens 26 and a mirror 27 which project an enlarged image 28 of the artwork 5 onto the bed 29.

Normally, and as illustrated, the light source 24 is used to illuminate the artwork 5 directly to produce the image to be scanned but it is possible to incorporate additional lenses and/or mirrors in the illumination or image-forming optical system.

The scanning head 15 is indexed (x axis) and moved along progressive linear scans (y axis) over the image (direct or otherwise) of the artwork 5 while the shutter 10 opens and closes under control of the unit 8 to scan the artwork image over a reference frame in the manner of a t.v. tube raster. The light input to the collector 21 is then relayed directly via the optical link 23 to the light emitter 22 which acts as a light source to expose film 6 mounted in a box 9 sealed off from ambient light of the surroundings. The film 6 is here mounted on a raisable lid 34 of the box 9 conveniently with a pocket or more preferably a vacuum system. By synchronising the scanning movements of the heads 15, 16 the same image as carried by the artwork 5 can be recreated on the film 6. However the control unit 8 permits synchronous movements of the heads 15, 16 to be interrupted to produced desired effects particularly those analogous to conventional retouching and photo-composing techniques.

An operator can set up certain parameters for the control by superimposing the artwork 5 on a digitizer 4 bearing a reference grid and by using a probe 3 to identify the areas of the image on the artwork 5 which are to be altered. The control unit 8 can then store these parameters and control the dynamic scanning operations performed by the heads 15, 16 accordingly. Over portions of the image on the artwork 5 which are to be re-created without change, the scanning operations performed by the heads 15, 16 run in synchronism. However by halting the scanning head 15 for example on a uniform background the head 16 can continue to scan to extend this background over other regions of the second image on the film 6. It is also possible to control the scanner unit 13 manually or otherwise and/or scan another separate image such as a film strip with a graduated colour range which is then used to create a portion of the image on the film 6. It is also possible to control the scanning operations to run asynchronously over certain regions of the respective images to create special effects.

Exposure modifiers such as masks or transparancies can also be interposed between the emitter 22 and the film 6 to create a mixed image on the film 6. The operation of the shutter means 10 also permits other effects, such as soft-edged silhouettes to be superimposed on the image on the film 6.

Figure 4:
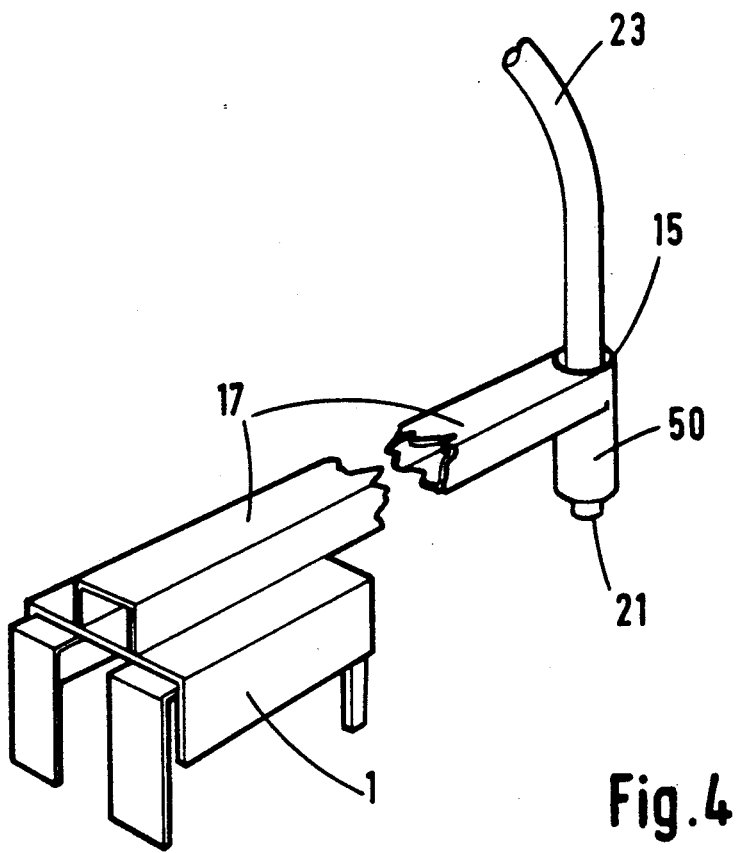

FIG. 4 depicts one form of scanning head 15 for the apparatus. The head 15 take the form of a simple tube 50 receiving the light collector 21 coupled to the fibre optic link 23. The tube 50 is supported on the arm 17 connected to the carriage 1 which moves in the x and y directions.

Figure 3:
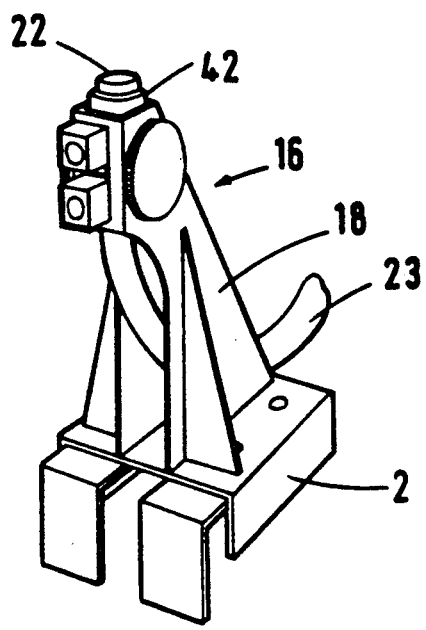
FIGS. 3 and 4 are perspective views of the scanning heads of the apparatus.
Figure 5:
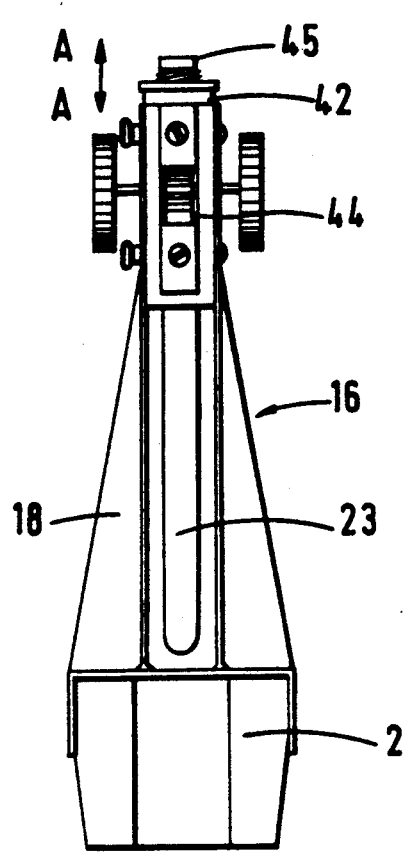
FIG. 5 is a front view of the output head.
Figure 6:
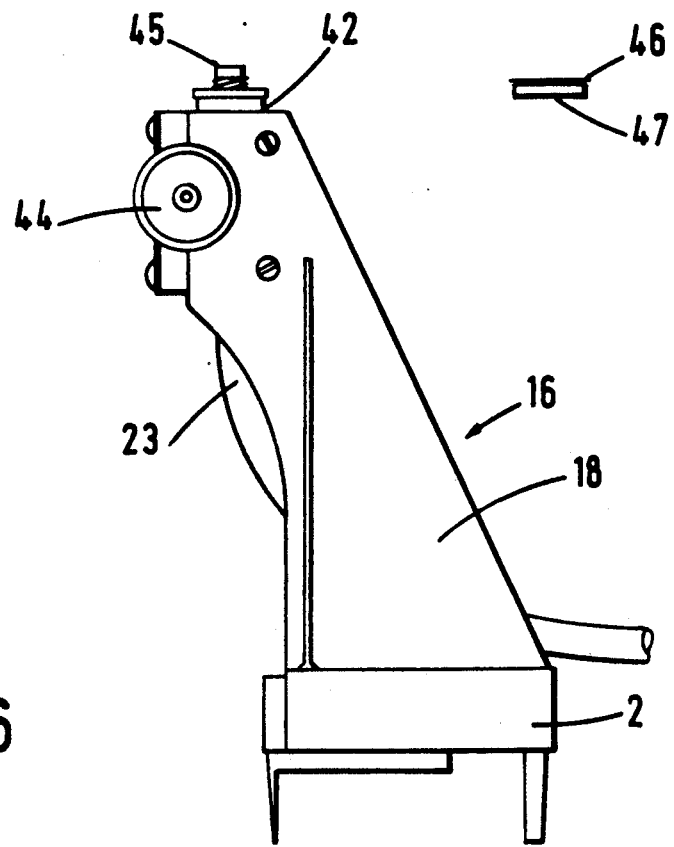
FIG. 6 is a side view of the output head.

FIGS. 3, 5 and 6 depict the scanning head 16 which is composed of the base carriage 2 moved in the x and y directions and the support structure 18 on which is mounted a tube 42 which receives the light emitter 22. The tube 42 is adjustable in the direction of arrows A-A with the aid of an adjustment mechanism 44. This mechanism 44 permits the position of the light emitter to be optimised viz a viz the film 6. As shown in FIG. 6, the upper end 45 of the tube 42 has a screw-thread to enable an apertured mask 46 supported by a screw-threaded ring 47 to be superimposed on the emitter 22. A range of masks 46 with apertures of different size, shape or other characteristic producing different effects, such as soft and hard edges can thus be employed.

In a modified form of apparatus the light collector 21 and/or emitter 22 is stationary and the corresponding artwork 5 (or image thereof) and/or film 6 is scanned in the x and y directions in relation to the stationary collector 21 and/or emitter 22 to achieve the same results. Where the collector 21 and emitter 22 are stationary a bore scope can be adopted.

It is also possible to use as the light collector 21 a device such as a CCD and to transfer electrical signals representing light values to a transducer which converts the electrical signals back into light for emission.

What is claimed is:

1. A method of re-creating an image carried on original photographic film but with selective controlled alterations; said method comprising forming an image by projecting light modified by original photographic film; subjecting the image to a scanning process with a punctiform light collector, the scanning process involving relative movement between the image and the collector to define a reference frame formed by a series of indexed lines of movement in two different directions and subjecting the image to the action of occluder means to inhibit the collection of light at certain times during the scanning process, transferring light collected by the collector or information representing such light to a punctiform light emitter, subjecting unexposed photographic film to another scanning process to create another image, the other scanning process involving relative movement between the film and the light emitter to expose the film over a frame formed by a series of indexed lines of movement in two different directions and generally corresponding to the reference frame and utilizing programmable control means to control the scanning processes independently of one another and to control the action of the occluder means in a manner that may be varied in accordance with unique characteristics of the image carried on the original photographic film and means for selecting regions of image to cause correlation of the processes over at least one region of the respective frames where the corresponding part of the other image is to be the same as the corresponding part of the original image and to cause non-correlation of the processes over at least one further region of the respective frame where a corresponding part of the other image is to be different to the corresponding other part of the original image.

2. Apparatus for re-creating an image carried on original photographic film but with selective controlled alterations, said apparatus comprising means for forming an image from projected light modified by original photographic film, punctiform light collecting means, means for scanning the image with the collecting means over a reference frame by relative movement between the collecting means and the image to define a series of indexed scanning lines of relative movement in two different directions, occluder means for subjecting the image to periodic interruptions to inhibit the collection of light at certain times during the scanning process, a punctiform light emitter, means for causing the light emitting means to emit light in accordance with light collected by the collecting means, means for scanning unexposed photographic film with the light emitter to create another image by relative movement between the film and the light emitter over a frame formed by a series of indexed scanning lines of relative movement in two different directions generally corresponding to the reference frame, and a computer programmed to control the operation of the respective scanning means and the interruption means in a manner that may be varied in accordance with unique characteristics of the image carried on the original photographic film and means for selecting regions of the image to cause correlation of the scanning processes over at least one region of the respective frames where the corresponding part of the other image is to be the same as the corresponding part of the original image and to cause non-correlation of the processes over at least one further region of the respective frame where a corresponding part of the other image is to be different to the corresponding other part of the original image.

3. A method of re-creating a photographic image with selective alterations; said method comprising creating a first image with light passed through occluder means which operates to transmit or block the light; scanning said first image with light collecting means by effecting relative movement between such image and said collecting means in first and second directions, the light-collecting means being small and punctiform in relation to the extent of the first image in both the first and second directions, transmitting light derived from the collecting means to light emitting means, scanning the light emitting means over photographic film to expose the film and create a second image thereon by effecting relative movement between the film and the emitting means in third and fourth directions, the emitting means being small and punctiform in relation to the second image in both the third and fourth directions and utilizing programmable control means to control the respective scanning operations independently in relation to the associated scanning directions and to control the operation of the occluder means in a manner that may be varied in accordance with unique characteristics of the image carried on the original photographic film and means for selecting regions of the image whereby to alter the second image in some respect from the first.

4. A method according to claim 3, wherein the scanning operations are performed in synchronism over portions of the first image which are to be unaltered in corresponding portions of the second image.

5. A method according to claim 3, wherein the light is transmitted directly via a fiber optic link.

6. A method according to claim 3, wherein each scanning operation involves moving the collecting or emitting means along a series of linear paths which are side-by-side.

7. A method according to claim 3 and further comprising scanning another image with the light collecting means to impose on the second image a portion corresponding to the other image.

8. A method according to claim 3 and further comprising halting the scanning of the first image at a selected zone while continuing to scan the light emitting means over a portion of the second image.

9. A method according to claim 3 wherein the first image is created by back illumination of a photographic transparency.

10. A method according to claim 3 wherein an exposure modifying means is interposed between light emitting means and the film.

11. Apparatus for use in re-creating a photographic image with selective alterations; said apparatus comprising a controllable shutter through which light is passed to produce a first image, light collecting means; first scanning means for scanning the first image with the light collecting means by relative movement between the first image and the light collecting means in first and second directions, the light collecting means being small and punctiform in relation to the extent of the first image in both the first and second directions; light emitting means, means for causing the light emitting means to emit light derived from the light collecting means, second scanning means for scanning the light emitting means over photographic film to expose the film and create a second photographic image by relative movement between the photographic film and the light emitting means in third and fourth directions, the light emitting means being small and punctiform in relation to the second image in both the third and fourth directions and programmable control means for controlling the respective first and second scanning means independently in relation to the associated scanning directions and for controlling the operation of the shutter means to alter the second image in some respect from the first image in a manner that may be varied in accordance with unique characteristics of the first image and means for selecting regions of the first image.

12. Apparatus according to claim 11, wherein a light transmitting means directly interconnects the collecting and emitting means.

13. Apparatus according to claim 12, wherein the light transmitting means is a fiber optic link and the ends of the fibers constitute at least in part the collecting and emitting means.

14. Apparatus according to claim 11 wherein each scanning means is composed of an x-y plotter.

15. Apparatus according to claim 11 wherein the control means at least includes a computer.

16. Apparatus according to claim 15, wherein the control means further includes a digitizer and probe used to select regions of the first image for alteration and to input information to the computer.

17. Apparatus according to claim 11 wherein there is further provided selectible apertured masks for modifying the light emitted by the emitting means.

18. Apparatus according to claim 11 wherein there is further provided selectible apertured transparencies for modifying the light emitted by the emitting means.

* * * * *

UNITED STATES PATENT AND TRADEMARK OFFICE
CERTIFICATE OF CORRECTION

PATENT NO. : 5,023,651

DATED : June 11, 1991

INVENTOR(S) : Richard J. BURCH et al.

It is certified that error appears in the above-identified patent and that said Letters Patent is hereby corrected as shown below:

On the Title page, item

[30] Foreign Application Priority Data, change "Feb. 19, 1986 [GB] United Kingdom.....8700121" to --Feb. 19, 1986 [GB] United Kingdom.....8604040--.

Signed and Sealed this

Thirtieth Day of November, 1993

Attest:

BRUCE LEHMAN

Attesting Officer

Commissioner of Patents and Trademarks